Figure 1:
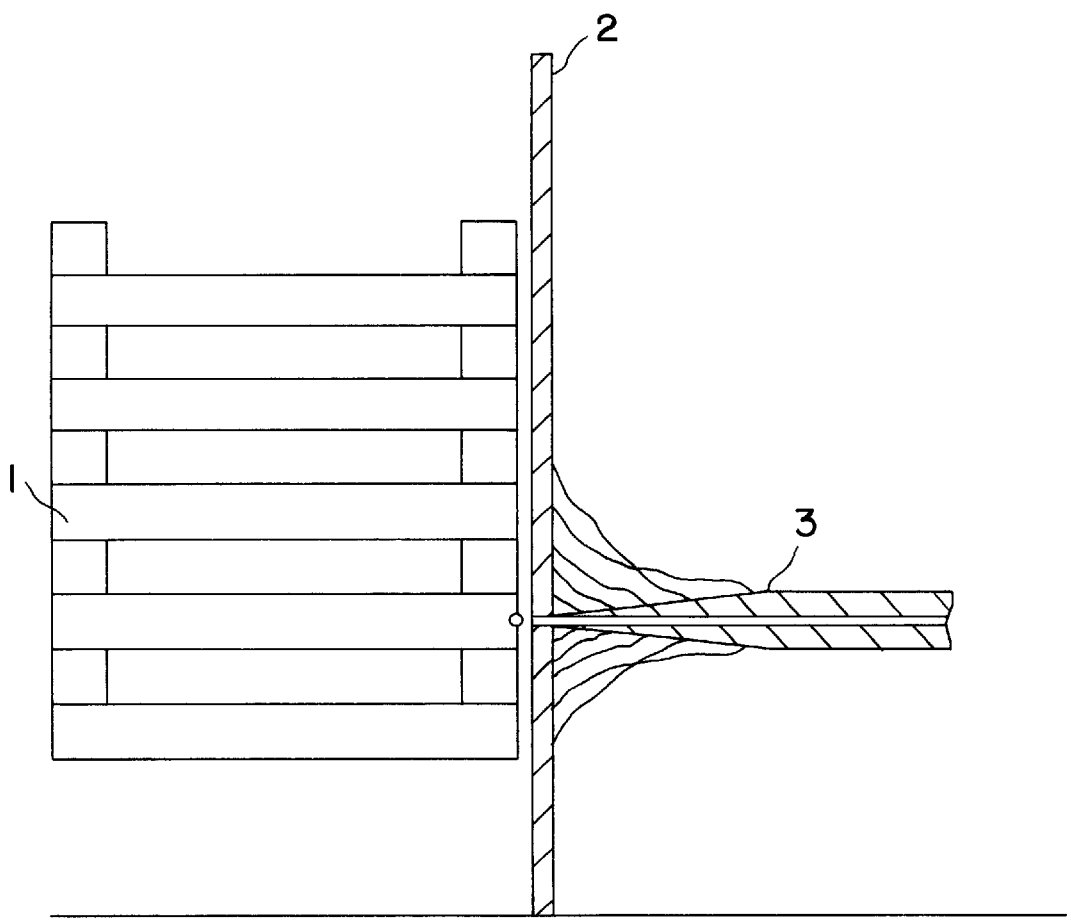

United States Patent [19]

Guenther et al.

[11] Patent Number: 6,004,892

[45] Date of Patent: Dec. 21, 1999

[54] FIRE PROTECTION COVERS MADE OF MELAMINE-FORMALDEHYDE RESIN FIBERS

[75] Inventors: Erhard Guenther, Hassloch; Wolfgang Reuther, Heidelberg, both of Germany

[73] Assignee: BASF Aktiengesellschaft, Ludwigshafen, Germany

[21] Appl. No.: 08/836,310

[22] PCT Filed: Nov. 9, 1995

[86] PCT No.: PCT/EP95/04406

§ 371 Date: May 12, 1997

§ 102(e) Date: May 12, 1997

[87] PCT Pub. No.: WO96/15207

PCT Pub. Date: May 23, 1996

[30] Foreign Application Priority Data

Nov. 12, 1994 [DE] Germany .................. 44 40 491.3

[51] Int. Cl.[6] ................................................ B32B 5/02
[52] U.S. Cl. .................. 442/229; 428/378; 428/379; 428/389; 442/136; 442/181
[58] Field of Search .................. 428/378, 379, 428/389; 442/136, 181, 229

[56] References Cited

U.S. PATENT DOCUMENTS 4,088,620 5/1978 Nihongi et al. .................. 260/29

4,269,944 5/1981 Redfarn .................. 521/100

FOREIGN PATENT DOCUMENTS

| 093 965 | 11/1983 | European Pat. Off. . |
|---|---|---|
| 221 330 | 5/1987 | European Pat. Off. . |
| 355 760 | 2/1990 | European Pat. Off. . |
| 408 947 | 1/1991 | European Pat. Off. . |
| 2364091 | 12/1973 | Germany . |
| 1089836 | 11/1967 | United Kingdom . |
| 1452629 | 10/1976 | United Kingdom . |
| 2203157 | 10/1988 | United Kingdom . |

OTHER PUBLICATIONS

Houben–Weyl, vol. 14/2, pp. 357–371.
Pat. Abst. of Japan, vol. 16, No. 63 (English abstract of JP 3261412, Nov. 21, 1991).
Pat. Abst. of Japan, vol. 00, No. 5184 (English abstract of JP 56107012, Aug. 25, 1981).
Pat. Abst. of Japan, vol. 14, No. 98 (English abstract of JP 20039928, Feb. 8, 1990).
Pat. Abst. of Japan, vol. 9, No. 150 (English abstract of JP 60003300, Jul. 29, 1983).
Pat. Abst. of Japan, vol. 5, No. 184 (English abstract of JP 56107012, Aug. 25, 1981).

Primary Examiner—Marion McCamish
Attorney, Agent, or Firm—Keil & Weikauf

[57] ABSTRACT

Melamine resin fibers are used for manufacturing fire-safety blankets.

17 Claims, 1 Drawing Sheet

FIRE PROTECTION COVERS MADE OF MELAMINE-FORMALDEHYDE RESIN FIBERS

The present invention relates to the use of melamine resin fibers for manufacturing fire-safety blankets.

The present invention further relates to fire-safety blankets comprising (a) from 5 to 95% by weight of melamine resin fibers, (b) from 95 to 5% by weight of flame-retardant fibers selected from the group consisting of glass fibers, flame-retardant wool, flame-retardant viscose and aramid fibers, and (c) from 0 to 25% by weight of fillers, a process for manufacturing fire-safety blankets, a method of extinguishing fires and burning objects, a method of protecting objects from fire, and the use of fire-safety blankets comprising melamine resin fibers for extinguishing fires and burning objects and for protecting objects from fire.

Fire-safety blankets based on glass fibers are known. The disadvantage to the use of glass fibers is that glass fibers are brittle and, since they are fusible, can burn through in the event of a fire.

Also known are fire-safety blankets based on aramids. Such blankets have the disadvantage of a very high price.

It is an object of the present invention to provide fire-safety blankets which are inexpensive and not brittle and do not melt in the event of a fire.

We have found that this object is achieved by using melamine resin fibers for manufacturing fire-safety blankets.

We have also found a process for manufacturing fire-safety blankets, a method of extinguishing fires and burning objects, a method of protecting objects from fire, a method of using fire-safety blankets comprising melamine resin fibers for extinguishing fires and burning objects, and also a method of using fire-safety blankets comprising melamine resin fibers for protecting objects from fire.

The melamine resin fibers can be produced for example by the methods described in EP-A-93 965, DE-A-23 64 091, EP-A-221 330 or EP-A-408 947. Particularly preferred melamine resin fibers include as monomer building block (A) from 90 to 100 mol % of a mixture consisting essentially of from 30 to 100, preferably from 50 to 99, particularly preferably from 85 to 95, mol % of melamine and from 0 to 70, preferably from 1 to 50, particularly preferably from 5 to 15, mol % of a substituted melamine I or mixtures of substituted melamines I.

As further monomer building block (B), the particularly preferred melamine resin fibers include from 0 to 10, preferably from 0.1 to 2, mol %, based on the total number of moles of monomer building blocks (A) and (B), of a phenol or a mixture of phenols.

The particularly preferred melamine resin fibers are customarily obtainable by reacting components (A) and (B) with formaldehyde or formaldehyde-supplying compounds in a molar ratio of melamines to formaldehyde within the range from 1:1.15 to 1:4.5, preferably from 1:1.8 to 1:3.0, and subsequent spinning.

Suitable substituted melamines of the general formula I

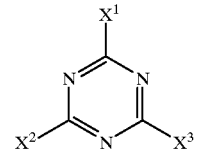

(I)

are those in which $X^1$, $X^2$ and $X^3$ are each selected from the group consisting of $-NH_2$, $-NHR^1$ and $-NR^1R^2$, although $X^1$, $X^2$ and $X^3$ must not all be $-NH_2$, and $R^1$ and $R^2$ are each selected from the group consisting of hydroxy-$C_2$–$C_{10}$-alkyl, hydroxy-$C_2$–$C_4$-alkyl-(oxa-$C_2$–$C_4$-alkyl)$_n$, where n is from 1 to 5, and amino-$C_2$–$C_{12}$-alkyl.

Hydroxy-$C_2$–$C_{10}$-alkyl is preferably hydroxy-$C_2$–$C_6$-alkyl such as 2-hydroxyethyl, 3-hydroxy-n-propyl, 2-hydroxyisopropyl, 4-hydroxy-n-butyl, 5-hydroxy-n-pentyl, 6-hydroxy-n-hexyl, 3-hydroxy-2,2-dimethylpropyl, preferably hydroxy-$C_2$–$C_4$-alkyl such as 2-hydroxyethyl, 3-hydroxy-n-propyl, 2-hydroxyisopropyl and 4-hydroxy-n-butyl, particularly preferably 2-hydroxyethyl or 2-hydroxyisopropyl.

Hydroxy-$C_2$–$C_4$-alkyl-(oxa-$C_2$–$C_4$-alkyl)$_n$ preferably has n from 1 to 4, particularly preferably n=1 or 2, such as 5-hydroxy-3-oxa-pentyl, 5-hydroxy-3-oxa-2,5-dimethylpentyl, 5-hydroxy-3-oxa-1,4-dimethylpentyl, 5-hydroxy-3-oxa-1,2,4,5-tetramethylpentyl, 8-hydroxy-3,6-dioxaoctyl.

Amino-$C_2$–$C_{12}$-alkyl is preferably amino-$C_2$–$C_8$-alkyl such as 2-aminoethyl, 3-aminopropyl, 4-aminobutyl, 5-aminopentyl, 6-aminohexyl, 7-aminoheptyl and also 8-aminooctyl, particularly preferably 2-aminoethyl and 6-aminohexyl, very particularly preferably 6-aminohexyl.

Substituted melamines particularly suitable for the invention include the following compounds: 2-hydroxyethylamino-substituted melamines such as 2-(2-hydroxyethylamino)-4,6-diamino-1,3,5-triazine, 2,4-di(2-hydroxyethylamino)-6-amino-1,3,5-triazine, 2,4,6-tris(2-hydroxyethylamino)-1,3,5-triazine, 2-hydroxyisopropylamino-substituted melamines such as 2-(2-hydroxyisopropylamino)-4,6-diamino-1,3,5-triazine, 2,4-di(2-hydroxyisopropylamino)-6-amino-1,3,5-triazine, 2,4,6-tris(2-hydroxyisopropylamino)-1,3,5-triazine, 5-hydroxy-3-oxapentylamino-substituted melamines such as 2-(5-hydroxy-3-oxapentylamino)-4,6-diamino-1,3,5-triazine, 2,4-di(5-hydroxy-3-oxapentylamino)-6-amino-1,3,5-triazine, 2,4,6-tris(5-hydroxy-3-oxapentylamino)-1,3,5-triazine, 6-aminohexylamino-substituted melamines such as 2-(6-aminohexylamino)-4,6-diamino-1,3-triazine, 2,4-di(6-aminohexylamino)-6-amino-1,3,5-triazine, 2,4,6-tris(6-aminohexylamino)-1,3,5-triazine or mixtures of these compounds, for example a mixture of 10 mol % of 2-(5-hydroxy-3-oxapentylamino)-4,6-diamino-1,3,5-triazine, 50 mol % of 2,4-di(5-hydroxy-3-oxapentylamino)-6-amino-1,3,5-triazine and 40 mol % of 2,4,6-tris-(5-hydroxy-3-oxapentylamino)-1,3,5-triazine.

Suitable phenols (B) are phenols containing one or two hydroxyl groups, such as unsubstituted phenols, phenols substituted by radicals selected from the group consisting of $C_1$–$C_9$-alkyl and hydroxyl, and also $C_1$–$C_4$-alkanes substituted by two or three phenol groups, di(hydroxyphenyl) sulfones or mixtures thereof.

Preferred phenols include phenol, 4-methylphenol, 4-tert-butyl-phenol, 4-n-octylphenol, 4-n-nonylphenol, pyrocatechol, resorcinol, hydroquinone, 2,2-bis(4- hydroxyphenyl)propane, 4,4'-dihydroxydiphenyl sulfone, particularly preferably phenol, resorcinol and 2,2-bis(4-hydroxyphenyl)propane.

Formaldehyde is generally used in the form of an aqueous solution having a concentration of, for example, from 40 to 50% by weight or in the form of compounds which supply formaldehyde in the course of the reaction with (A) and (B), for example in the form of oligomeric or polymeric formaldehyde in solid form, such as paraformaldehyde, 1,3,5-trioxane or 1,3,5,7-tetroxocane.

Fibers are produced using preferably from 1 to 50, particularly preferably from 5 to 15, especially from 7 to 12, mol % of the substituted melamine and also customarily from 0.1 to 9.5, preferably from 1 to 5, mol % of one of the above-recited phenols or mixtures thereof.

The particularly preferred melamine resin fibers are produced by polycondensing customarily melamine, optionally substituted melamine and optionally phenol together with formaldehyde or formaldehyde-supplying compounds. All the components can be present from the start or they can be reacted a little at a time and gradually while the resulting precondensates are subsequently admixed with further melamine, substituted melamine or phenol.

The polycondensation is generally carried out in a conventional manner (see EP-A-355 760, Houben-Weyl, Vol. 14/2, p. 357 ff).

The reaction temperatures used will generally be within the range from 20 to 150° C., preferably from 40 to 140° C.

The reaction pressure is generally uncritical. The reaction is generally carried out within the range from 100 to 500 kPa, preferably at atmospheric pressure.

The reaction can be carried out with or without a solvent. If aqueous formaldehyde solution is used, typically no solvent is added. If formaldehyde bound in solid form is used, water is customarily used as solvent, the amount used being generally within the range from 5 to 40, preferably from 15 to 25, % by weight, based on the total amount of monomer used.

Furthermore, the polycondensation is generally carried out within a pH range above 7. Preference is given to the pH range from 7.5 to 10.0, particularly preferably from 8 to 9.

In addition, the reaction mixture may include small amounts of customary additives such as alkali metal sulfites, for example sodium metabisulfite and sodium sulfite, alkali metal formates, for example sodium formate, alkali metal citrates, for example sodium citrate, phosphates, polyphosphates, urea, dicyandiamide or cyanamide. They can be added as pure individual compounds or as mixtures with each other, either without a solvent or as aqueous solutions, before, during or after the condensation reaction.

Other modifiers are amines and also aminoalcohols such as diethylamine, ethanolamine, diethanolamine or 2-diethylaminoethanol.

Further suitable additives include fillers and emulsifiers.

Examples of suitable fillers include fibrous or pulverulent inorganic reinforcing agents or fillers such as glass fibers, metal powders, metal salts or silicates, for example kaolin, talc, baryte, quartz or chalk, also pigments and dyes. Emulsifiers used are generally the customary nonionic, anionic or cationic organic compounds with long-chain alkyl radicals.

The polycondensation can be carried out batchwise or continuously, for example in an extruder (see EP-A-355 760), in a conventional manner.

Fibers are produced by spinning generally the melamine resin of the present invention in a conventional manner, for example following addition of a hardener, customarily acids such as formic acid, sulfuric acid or ammonium chloride, at room temperature in a rotospinning apparatus and subsequently completing the curing of the crude fibers in a heated atmosphere, or spinning into a heated atmosphere while at the same time evaporating the water used as solvent and curing the condensate. Such a process is described in detail in DE-A-23 64 091.

Fire-safety blankets are customarily manufactured by converting the melamine resin fibers into yarns in a conventional manner, for example by woollen spinning. The yarns preferably have a linear density within the range from 100 to 200, particularly preferably from 140 to 160, tex. The yarns are then generally woven up in a conventional manner to wovens having a basis weight within the range from 70 to 900, preferably from 120 to 500, g/m$^2$.

Nonwovens are generally obtainable by processing the melamine resin fibers on webbers with crosslayers. Nonwovens produced exclusively with melamine resin fibers, for example Basofil® fibers, preferably have a basis weight within the range from 30 to 600, preferably from 50 to 450, g/m$^2$.

After cutting to the desired blanket dimensions, which from experience so far only depend on the intended use, the edges of the blankets can be consolidated by sewing.

If desired, the melamine resin fibers may have added to them up to 25, preferably up to 10, % by weight of customary fillers, in particular those based on silicates such as mica, dyes, pigments, metal powders and delusterants, and then be processed into the corresponding fire-safety blankets and nonwovens.

A preferred embodiment comprises using metal-coated melamine resin fibers, preferably aluminum-coated melamine resin fibers, which is also to be understood as meaning blends of uncoated and metal-coated melamine resin fibers. More particularly, the aluminum-coated melamine resin fibers can be prepared in a conventional manner, for example by adhering aluminum foil or an aluminized film to the melamine resin fibers or by subjecting the melamine resin fibers to a high vacuum aluminum vapor deposition process. The thickness of the metal layer or of the aluminum layer in particular is customarily chosen within the range from 10 to 150 $\mu$m, preferably from 50 to 100 $\mu$m.

In a further preferred embodiment, the melamine resin fibers, with or without metal coating, can also be admixed with salts, especially silicates, particularly preferably magnesium aluminum silicates, or foam-developing substances, by saturating, brushing or similar processes.

According to the present invention, it is also possible to process into fire-safety blankets fiber blends which consist essentially of from 5 to 95, preferably from 20 to 95, particularly preferably from 40 to 95, % by weight of melamine resin fibers and from 95 to 5, preferably from 80 to 5, particularly preferably from 60 to 5, % by weight of flame-retardant fibers.

The fiber blends are processed in a conventional manner, for example on customary fiber-blending apparatus as described in Vliesstoffe, Georg Thieme Verlag. In a preferred embodiment, it is customary to start from staple fibers having a customary length of from 1 to 20 cm. These are generally fed via a conveyor into a flat card and preblended therein. The blending is then generally completed in a roller card to obtain a waddinglike web. The resulting waddinglike web is then customarily further processed into yarns or nonwovens, for which the processes customary in the textile industry can be used.

In a preferred embodiment, the flame-retardant fibers used are glass fibers, flame-retardant wool, flame-retardant viscose and aramid fibers, particularly preferably aramid fibers.

Aramid fibers are preferably produced by spinning from solutions of polycondensation products of iso- or tereph-thalic acid or their derivatives such as acid chlorides with para- or meta-phenylene-diamine in solvents such as N-methylpyrrolidone, hexamethylphosphoramide and concentrated sulfuric acid or customary mixtures thereof. The resulting continuous filament fibers are then customarily cut into staple fibers whose thickness is generally from 5 to 25 $\mu$m. Preferred aramid fibers are those based on an isomeric poly-p-phenyleneterephthalamide.

The present invention also provides fire-safety blankets constructed of (a) from 95 to 5, preferably from 95 to 20, particularly preferably from 95 to 40, % by weight of melamine resin fibers, (b) from 5 to 95, preferably from 5 to 80, particularly preferably from 5 to 60, % by weight of flame-retardant fibers selected from the group consisting of glass fibers, flame-retardant wool, flame-retardant viscose and aramid fibers, and (c) from 0 to 25, preferably from 0 to 10, % by weight of fillers, based on (a) and (b), in particular based on silicates, with the proviso that the amount of component (c) is not zero when component (b) includes aramid fibers exclusively.

In a preferred embodiment, the fibers used are metal-coated, in particular aluminum-coated, melamine resin fibers.

Suitable fillers besides the preferred silicates, in particular mica, include the customary fillers such as dyes, pigments, metal powders and delusterants.

According to the present invention, the fire-safety blankets are used for extinguishing fires and burning objects and persons.

Furthermore, the fire-safety blankets of the invention are used for protecting persons and objects from fire by covering the persons and objects to be protected, in particular houses and containers on trucks, trains or ships which contain flammable substances such as road tankers and gas containers with the fire-safety blankets of the present invention and awaiting the attack of the fire.

The advantage of the fire-safety blankets and nonwovens of the present invention is that the fire-safety blankets and nonwovens manufactured according to the present invention do not melt on heating or on direct contact with a fire or flame and thus also do not drip and the blankets and nonwovens therefore are and remain shape-stable.

EXAMPLES

The protective effect afforded by the disclosed fibers, webs and wovens was tested on test specimens utilized in the Methods of test for Assessment of the ignitability of upholstered seating by smouldering and flaming ignition sources, British Standards BS 5852: 1990, Section 3, Crib 5.

FIG. 1 illustrates the test rig for determining the flame shielding effect: a wooden crib (1) with the corresponding inventive test fabric (2) secured directly in front. At a distance of 70 mm in front of the fabric was a Bunsen burner (3) whose inner flame cone (reductive zone) impinged exactly on the test object (gas flow 70 l/h). The temperature in this flame cone was within the range from 1200 to 1300° C. The time needed to ignite the crib (1) after impingement of the flame on the test fabric (2) was determined (see table below).

TABLE

| Test object | time in [sec] |
|---|---|
| no fabric | 5 |
| fabric composed of melamine resin fiber[1] | 210 |
| fabric composed of aluminum-coated melamine resin fiber[2] | 300 |
| needlefelt composed of melamine resin fiber[3] | 300 |
| needlefelt composed of melamine resin fiber and p-aramid fiber[4] | 150 |
| needlefelt composed of melamine resin fiber and p-aramid fiber coated with Mirkolite © 5 | 180 |

[1]Melamine resin fiber produced according to Example 1 of EP-A 408 947, the density of the fibers was 1.43 g/cm$^3$, the staple length was 5.08 cm, 2% of the fibers had 0.3 denier per filament (dpf), 8% had 0.9 dpf, 21% had 1.5 dpf, 22% had 2.1 dpf, 17% had 2.7 dpf, 13% had 3.3 dpf, 7% had 3.9 dpf, 10% had >3.9 dpf (1 denier = 1 dtex/1.11, and 1 dtex = 1 g/10,000 m), basis weight: 850 g/m$^2$;
[2]Fibers as in 1, aluminum layer thickness 70 $\mu$m, basis weight: 850 g/m$^2$;
[3]Fibers as in 1, basis weight: 430 g/m$^2$;
[4]Melamine resin fibers as in 1, 70% by weight, and 30% by weight of p-aramid fiber, basis weight: 68 g/m$^2$;
[5]Needlefelt as in 4, but coated with a magnesium aluminum silicate dispersion (Mirkolite ©, from Grace) - 2–3% by weight of dispersion based on the total weight of the needlefelt;

We claim:

1. Fire-safety blankets comprising
   (a) from 5 to 95% by weight of metal coated melamine resin fibers,
   (b) from 95 to 5% by weight of flame-retardant fibers selected from the group consisting of glass fibers, flame-retardant wool, flame-retardant viscose and aramid fibers, and
   (c) from 0 to 25% by weight of fillers,
   with the proviso that the amount of component (c) is not 0 when component (b) includes aramid fibers exclusively.

2. Fire-safety blankets as claimed in claim 1, wherein the aramid fibers are a polycondensation product of iso- or tere-phthalic acid with a meta- or para-phenylenediamine.

3. The fire-safety blanket of claim 1 wherein the metal coating the melamine resin fiber is aluminum.

4. The fire-safety blanket of claim 3 wherein the thickness of the aluminum coating is from 10 to 50 $\mu$m.

5. In a method of extinguishing fires and burning objects by blanketing, the improvement wherein the blanket is that of claim 1.

6. In a method of protecting objects from fire by blanketing, the improvement wherein the blanket is that of claim 1.

7. In a fire-safety blanket, the improvement wherein the blanket contains metal coated melamine resin fibers.

8. The fire-safety blanket of claim 7 wherein the melamine resin is prepared by condensation of a mixture comprising:
   (A) from 90 to 100 mol % of a mixture consisting essentially of
     (a) from 30 to 100 mol % of melamine and
     (b) from 0 to 70 mol % of a substituted melamine of the general formula I where $X^1$, $X^2$ and $X^3$ are each selected from the group consisting of —NH$_2$, NHR$^1$ and NR$^1$R$^2$, and $X^1$, $X^2$ and $X^3$ are not all —NH$_2$, and R$^1$ and R$^2$ are selected from the group consisting of hydroxy-C$_2$–C$_{20}$-alkyl, hydroxy-C$_2$–C$_4$ -alkyl-(oxa-C$_2$–C$_4$alkyl)$_n$, where n is from 1 to 5, and amino-C$_2$–C$_{12}$-alkyl, or mixtures of melamines 1, and
   (B) from 0 to 10 mol %, based on (A) and (B), of at least one phenol which is unsubstituted or substituted by one or more radicals selected from the group consisting of $C_1$–$C_9$-alkyl and hydroxy $C_1$–$C_4$-alkanes substituted by two or three phenol groups, di(hydroxyphenyl) sulfones, or mixtures of these phenols, with formaldehyde or formaldehyde-supplying compounds in a molar ratio of melamines to formaldehyde within the range from 1:1.15 to 1:4.5.

9. The fire-safety blanket of claim 8 wherein component (B) is present in a range of from 0.1 to 9.5%.

10. The fire-safety blanket of claim 9 wherein component (B) is present in a range of from 0.1 to 9.5%.

11. The fire-safety blanket of claim 8 wherein the metal coating the melamine resin fiber is aluminum.

12. The fire-safety blanket of claim 11 wherein the thickness of the aluminum coating is from 10 to 50 μm.

13. In a method of extinguishing fires and burning objects by blanketing, the improvement wherein the blanket is that of claim 8.

14. In a method of protecting objects from fire by blanketing, the improvement wherein the blanket is that of claim 8.

15. The fire-safety blanket of claim 8 wherein the phenol (s) are present from 0.1 to 2 mol %.

16. The fire-safety blanket of claim 7 wherein the metal coating the melamine resin fiber is aluminum.

17. The fire-safety blanket of claim 7 wherein the blanket comprises from 5 to 95% of the metal coated melamine resin fiber and 95 to 5% of another flame retardant fiber.

\* \* \* \* \*

UNITED STATES PATENT AND TRADEMARK OFFICE
CERTIFICATE OF CORRECTION

PATENT NO. : 6,004,892
DATED : December 21, 1999
INVENTOR(S) : GUENTHER et al.

It is certified that error appears in the above-identified patent and that said Letters Patent is hereby corrected as shown below:

Col. 6, claim 8, line 63, "hydroxy-$C_2$-$C_4$ -alkyl-" should be --hydroxy-$C_2$-$C_4$-alkyl--.

Col. 6, claim 8, line 65, "amino-$C_2$-$C_2$-alkyl" should be --amino-$C_2$-$C_{12}$-alkyl--.

Signed and Sealed this

Twenty-ninth Day of August, 2000

*Attest:*

Q. TODD DICKINSON

*Attesting Officer*     *Director of Patents and Trademarks*